United States Patent [19]

Sewon

[11] Patent Number: 5,039,545

[45] Date of Patent: * Aug. 13, 1991

[54] REUSABLE BRINE FOR CONSERVING CUCUMBER

[76] Inventor: Pentti Sewon, Pirttilahdegatan 11, Abo, Finland, SF-20320

[ * ] Notice: The portion of the term of this patent subsequent to Nov. 28, 2006 has been disclaimed.

[21] Appl. No.: 522,604

[22] Filed: May 11, 1990

[51] Int. Cl.$^5$ .............................................. A23L 3/00
[52] U.S. Cl. ................................... 426/654; 426/267; 426/268; 426/270; 426/321; 426/335; 426/532
[58] Field of Search ............... 426/267, 268, 270, 532, 426/654, 321, 335

[56] References Cited

U.S. PATENT DOCUMENTS 4,883,679 11/1989 Sewón ................................. 426/532

Primary Examiner—Donald E. Czaja
Assistant Examiner—Leslie Wood
Attorney, Agent, or Firm—Thomas R. Vigil

[57] ABSTRACT

The invention relates to a brine for conserving cucumber in bulk which is low in sodium chloride. The brine according to the invention is an aqueous solution containing per liter of the solution; at least 0.02 kg sodium chloride, 0,02–0.12 kg acetic or lactic acid or a nontoxic salt thereof, and at least 0.1 g calcium chloride. The taste, crispness and color of a product processed from cucumbers stored in this brine in containers equipped with stirring means for an extended period are equal to that of fresh packed cucumbers even in tropical climates and the brine can be reused after addition of make-up ingredients.

10 Claims, No Drawings 5,039,545

REUSABLE BRINE FOR CONSERVING CUCUMBER

BACKGROUND OF THE INVENTION

1. Field of the Invention

The present invention relates to cucumber conservation in hot climates and especially a reusable brine for conserving cucumbers in bulk in containers equipped with means for stirring the brine.

2. Description of the related art including information disclosed under 37 CFR Sections 1.97-99

Cucumbers may be pickled and canned directly after harvest as so called "fresh packs" resulting in pickled cucumbers having a good taste and crispy consistency. The processing of cucumbers to produce fresh packs is also very uncomplicated including essentially only putting sorted and picked cucumbers 5 into cans or jars, adding the pickling solution, closing the cans or jars, and finally heat treating the closed cans or jars to pasteurize their content. The drawback of this procedure is that it requires a very big processing capacity during the relatively short harvest period.

In order to overcome this drawback and enable processing huge quantities of cucumbers during an extended period with less personnel and processing equipment, part of the harvest is conventionally fermented and stored in bulk in large silos. From these silos cucumbers are withdrawn at a desired rate for processing in a conventional manner.

Without discussing in detail different known fermentation procedures one may in general contend that the pickled cucumbers processed from such fermented bulk products, are not of the same high quality as those of fresh packed cucumbers. The controlling of the fermentation process to obtain an even quality is also difficult and the yield, taste, color and consistency of the pickled cucumbers are not so good as for fresh packs.

From the specification of U.S. Pat. No. 4,833,679 there is known a brine for conserving cucumbers in bulk making fermentation of the cucumbers unnecessary. Commercial applications of this brine have a relatively high sodium chloride content of about 0.3 kg per liter of the aqueous solution. Such a brine may after use cause serious effluent problems and necessities expensive and painstaking desalination of huge quantities of brine. This brine sometimes produces a negative umber color in cucumbers conserved in tropical climates.

It is known that the sodium chloride content in brine for conserving cucumbers should be increased when the ambient temperature is increased or decreased, in the latter case to prevent the brine from freezing into ice. Thus, it was quite surprising to find that the sodium chloride content of a brine for conserving cucumbers in hot climates could be lowered provided its content of ingestible acids such as acetic and lactic acid was simultaneously kept at a relatively high level. It was also unexpected that the conserving effect of such a brine in every respect was improved in comparison to the brine disclosed in the specification of U.S. Pat. No. 4,883,679 although several of its ingredients, conventionally considered necessary, were deleted.

The main advantage of the present invention, however, is that it provides a brine which can be reused after addition of sodium and calcium chlorides and acid to compensate for chemicals absorbed by the cucumbers during conservation. Conventional brines have caused serious effluent problems due to their high chloride content, whereas the present reusable brine will not cause any waste water problems whatsoever. Thus, the brine of the present invention also helps to conserve the environment.

The low salinity of the brine of the present invention is sufficient to conserve cucumbers in hot climates with an average temperature of about 30° C when the concentration of acid is kept relatively high and when the brine is stirred in conventional manner to maintain a homogeneous salt concentration throughout the brine. No negative umber color was observed in these conditions.

The object of the present invention is thus to provide a reusable brine for conserving cucumbers in bulk in stirred containers and hot climates which brine has a very low chloride content and which does cause less or no effluent problems at all.

The present invention also enables obtaining picked cucumbers of substantially the same high quality as by fresh packing but with the same personnel and capital investments as with the known fermentation processes used for storing the cucumbers in bulk awaiting processing for canning.

According to the present invention, cucumbers are conserved in bulk by submerging the same in a brine containing in solution at least about 0.02 kg NaCl, 0.02-0.12 kg of an ingestible acid such as acetic acid including vinegar, or lactic acid, or a non-toxic salt thereof, and at least 0.1 g of an ingestible calcium salt such as $CaCl_2$. When only the lower limit is given, it should be understood that the upper limit is set by the solubility of respective ingredient in the brine solution. It is, however, usually sufficient to use less than 0.15 kg sodium chloride and preferably not more than 0.12 kg of sodium chloride per liter of aqueous solution.

EXAMPLE

Assorted cucumbers of various size were washed shortly after harvest. The cucumbers were then stored in silos provided with stirring means for circulating the brine at least in the beginning of the conservation period as is conventional in this field, for about two months immersed in about the same volume of an aqueous brine solution representing a preferred embodiment of the invention and containing per liter of said aqueous solution: 0.12 kg NaCl, 0.04 kq acetic acid, and 3.5 g $CaCl_2$.

After this period the brine was withdrawn and topped off NaCl, acetic acid and $CaCl_2$ for reuse. Then the stored with NaCl, acetice acid and $CaCl_2$ for reuse. Then the stored cucumbers were put directly into cans, buckets or jars together with a spiced picking solution containing conventional pickling ingredients such as vinegar, spices and optional sweeteners. Finally the cans, buckets or jars were closed, and hermetically sealed if required.

It was observed that bigger cucumbers could be used than in the above fermentation processes and that the cucumbers so conserved and processed were crispy and of the same high quality as those obtained by fresh packing cucumbers although the cucumbers had been stored for an extended period in a hot climate and in bulk before processing. It was also observed that satisfactory results were obtained with even as low sodium chloride contents as 0.01 kg per liter solution.

I claim:

1. A reusable brine for conserving cucumber in bulk in stirred containers and in hot climates comprising in solution per liter of the brine: at least 0.02 kg sodium chloride, 0.02–0.12 kg of an ingestible acid or a nontoxic salt thereof, and at least 0.1 q of an ingestible calcium salt.

2. The brine of claim 1 wherein the ingestible acid is acetic acid.

3. The brine of claim 2 wherein said ingestible acid includes vinegar.

4. The brine of claim 2 comprising not more than 0.12 kg sodium chloride per liter of aqueous solution.

5. The brine of claim 1 wherein the ingestible acid is lactic acid.

6. The brine of claim 5 comprising per liter of aqueous solution:

| | |
|---|---|
| 0.12 kg | sodium chloride |
| 0.04 kg | acetic acid |
| 3.5 g | calcium chloride |

7. The brine of claim 1 wherein the ingestible calcium salt is $CaCl_2$.

8. The brine of claim 7 comprising per liter of aqueous solution:

| | |
|---|---|
| 0.12 kg | sodium chloride |
| 0.04 kg | acetic acid |
| 3.5 g | calcium chloride |

9. The brine of claim 1 comprising not more than 0.12 kg sodium chloride per liter of aqueous solution.

10. The brine of claim 9 comprising per liter of aqueous solution:

| | |
|---|---|
| 0.12 kg | sodium chloride |
| 0.04 kg | acetic acid |
| 3.5 g | calcium chloride |

* * * * *